United States Patent [19]

Broer et al.

[11] Patent Number: 5,727,860
[45] Date of Patent: Mar. 17, 1998

[54] INTERLACED IMAGE PROJECTION APPARATUS

[75] Inventors: Dirk J. Broer, Eindhoven, Netherlands; John A. Clarke, Carshalton, Great Britain

[73] Assignee: U.S. Philips Corporation, New York, N.Y.

[21] Appl. No.: 627,534

[22] Filed: Apr. 4, 1996

[51] Int. Cl.$^6$ .................................................. G03B 21/14
[52] U.S. Cl. ............................ 353/20; 353/122; 359/495
[58] Field of Search ........................... 353/122, 38, 31; 349/5; 359/495, 494; 348/752, 762, 767

[56] References Cited

U.S. PATENT DOCUMENTS

| | | | |
|---|---|---|---|
| 5,042,925 | 8/1991 | Broer et al. | 359/37 |
| 5,098,184 | 3/1992 | Van Den Brandt et al. | 353/102 |
| 5,184,248 | 2/1993 | De Vaan et al. | 359/483 |
| 5,467,207 | 11/1995 | Fortner et al. | 353/38 |
| 5,537,256 | 7/1996 | Fergason | 348/767 |
| 5,601,351 | 2/1997 | van den Brandt | 353/20 |
| 5,612,797 | 3/1997 | Clarke | 349/5 |
| 5,636,912 | 6/1997 | Lee et al. | 353/46 |

OTHER PUBLICATIONS

"A Practical Wobbling Device Using Ferroelectric Liquid Crystals for Realizing High Resolution Projectors", A. Yasuda et al, ASAI Display, 1995, pp. 79–82.

*Primary Examiner*—William Dowling
*Attorney, Agent, or Firm*—Walter M. Egbert, III

[57] ABSTRACT

An image projection apparatus which comprises an illumination unit, an image display unit, a projection lens and an electro-optical deflection unit arranged between the display unit and the projection lens and being switchable between a first mode and a second mode and comprising a polarization switch and a birefringent element, whereby the light rays from the display unit passing through the deflection unit if the deflection unit is in the first mode are shifted relative to said light rays passing through the deflection unit if this unit is in the second mode. The birefringent element comprises at least one birefringent oriented polymer layer.

20 Claims, 6 Drawing Sheets

INTERLACED IMAGE PROJECTION APPARATUS

BACKGROUND OF THE INVENTION

The present invention relates to an image projection apparatus comprising an illumination unit, an image display unit having at least one image display panel, a projection lens for projecting the image generated by the display unit onto a projection screen and an electro-optical deflection unit arranged between the display unit and the projection lens, being switchable between a first mode and a second mode, and comprising a polarization switch and a birefringent element, whereby the light rays from the display unit passing through the deflection unit when the deflection unit is in the first mode are shifted relative to said light rays when the deflection unit is in the second mode.

Such a projection apparatus may be used for large-scale displaying a broadcast videoprogramme, or of an image signal from a storage medium, for example, an optical disc or a computer medium. The image display panel used in such an apparatus may be a matrix LCD panel consisting of a layer of liquid crystalline material sandwiched between two substrate plates and preceded by a polarizer and succeeded by an analyzer. This panel is divided into a large number of picture elements, or pixels, arranged in rows and columns by a structure of row and column electrodes on one of the substrate plates, along which electrodes switching signals are guided to the pixels. The matrix LCD panel may be of the active type, which means that a switching transistor, for example, a thin film transistor (TFT) is provided for each individual pixel.

In conventional projection apparatus, the image display panel, or the three panels if the image generating unit has three colour channels for red, green and blue, should have a number of pixel rows which is equal to the number of image lines in the video signal so as to ensure that no image information gets lost. For displaying a standard TV signal, the display panel should have, for example, 574 pixel rows. Such a display panel is difficult to manufacture. As the pixels should be separated from each other, the sum of the pixel apertures, or lighttransmissive portions of the pixel cells, is smaller than the surface area of the display panel. This ratio, usually called the aperture ratio, is further reduced in an active matrix display by the switching transistors which should be shielded against the projection light. For a display panel with said 574 pixel rows the aperture ratio is small so that a considerable portion of the light from the illumination unit does not pass through the panel. The manufacture and small aperture ratio pose very serious for a display panel by which a high-definition (HD) TV signal should be displayed. Since each pixel of the panel passes light at each moment, old image information is interwoven between the most recent image information, which leads to artefacts in a picture with fast moving parts. During each picture frame, only part of the pixel rows is provided with new picture information, which will result in discharge of the pixels, leading to a decrease of picture contrast and to flicker.

The article: "A practical wobbling device using Ferro-Electric Liquid Crystals for realizing high resolution projectors" in: "Asia Display 1995 pages 79–81, discloses a liquid crystal video projector wherein the odd field of a picture frame is displayed by the same pixel rows as the even field. To that end, the known projector comprises a wobbling device. This device is arranged between the LCD panel and the projection lens and consists of a segmented polarization switch and a birefringent plate. The polarization switch, a ferro-electric liquid crystal plate, rotates the plane of polarization of the light from the display panel between parallel and perpendicular to the plane of polarization of the light from the panel. The birefringent plate changes the direction of propagation of the light rays depending on the plane of polarization. The driving signal for the wobbling device is synchronized with an interlaced image signal which contains two fields for each picture frame and, for example, 25 or 30 frames per second. If the picture lines corresponding to the second field are shifted to the areas between the pixel rows, the number of displayed horizontal lines appears to be doubled. In this way, for displaying a standard TV-signal, an NTSC signal or a PAL signal a display panel can be used having a number of pixel rows half of that of a conventional display, and thus having a larger aperture ratio. On the other hand a high definition picture having, for example, 1148 horizontal lines can be displayed by a panel which is originally intended for displaying a standard TV signal.

In the known projection apparatus, the birefringent element is a quartz crystal plate, which is an expensive element and not suitable for mass application.

SUMMARY OF THE INVENTION

It is an object of the invention to provide an image projection apparatus which uses an interlace technique and can be manufactured at reduced cost. This apparatus is characterized in that the birefringent element comprises at least one birefringent oriented polymer layer.

Such a polymer layer based on the technology of in-situ polymerization of, for example a liquid crystalline system developed in the applicant's labs, has proved to be a low-cost material of good optical quality and is suitable for performing the birefringent function in the projection apparatus.

The polymer material as such is disclosed in U.S. Pat. No. 5,042,925 which relates to a polarization-sensitive beam splitter. This beam splitter comprises two transparent elements of non-birefringent material between which a polarization-separating layer in the form of a birefringent oriented polymer adhesive layer is interposed. The extraordinary refractive index of said adhesive layer is equal to the refractive index of the transparent elements, and the ordinary refractive index of said layer is smaller than its extraordinary refractive index. This layer is positioned relative to the entrance face of the beam splitter, such that the extra-ordinary component of the beam passes straight through the layer and the beam splitter, whereas the ordinary component of the incident beam is totally reflected at the interface of the first transparent element and the polymer layer. The latter component thus does not pass through the layer and propagates in a direction which is substantially different from the direction of propagation of the extraordinary component. In the birefringent element of the invention, both an extraordinary beam and an ordinary beam pass through the polymer layer and their directions of propagation are only slightly shifted relative to each other. The required amount of shifting is determined by the distance between the pixel rows of the display panel.

The birefringent element may have the form of a plane-parallel plate arranged at an acute angle, preferably at 45°, with the axis of the apparatus and having its optical axis oriented either parallel or perpendicular to the surface of the element. Alternatively the plate may be arranged perpendicular to the axis of the apparatus and its optical axis at 45 with the normal on the plate surface. In both cases, the birefringent plate provides a lateral shift between the two differently polarized beams, and its position in the beam path is not critical. This birefringent plate should have a thickness of the order of 300–400 microns.

To reduce the thickness of the birefringent polymer layer and the risk of scattering of the light passing through it, the use of one of the embodiments described below is preferred.

A first embodiment is characterized in that the birefringent element comprises at least on wedge-shaped birefringent oriented polymer body.

A second embodiment is characterized in that the birefringent element comprises at least one wedge-shaped birefringent oriented polymer layer sandwiched between two transparent plates of isotropic material and extending at an acute angle with each other.

The maximum thickness of said body or layer, at the base, can be limited to the order of tens of microns, so that the risk of scattering of the light is eliminated and the amount of polymer material is considerably reduced. The wedge-shaped polymer element provides an angular shift between the two differently polarized beams, and in order to obtain a transversal shift corresponding to the distance between the pixel rows of the display panel, this element should be arranged at a specific distance from the display panel.

A third embodiment of the birefringent element, which provides an angular shift, is characterized in that the birefringent oriented polymer layer comprises a series of triangular elements jointly together constituting a sawtooth-shaped layer which is fixed to a transparent isotropic substrate.

An embodiment of the birefringent element which provides a lateral shift between the two differently polarized beams, is characterized in that it comprises a central substrate of isotropic material and a first and a second layer of birefringent oriented polymer at the first and the second main surface respectively of the substrate, and in that the interfaces between the layers and the substrate are parallel to each other and extend at an acute angle with the entrance and exit faces of the element.

An alternative and preferred embodiment is characterized in that the birefringent element comprises a central substrate of isotropic material and a first and a second layer of birefringent oriented polymer at the first and second main surface respectively of the substrate, and in that the interfaces between the layers and the substrate are sawtooth-shaped.

The above embodiments of the birefringent element are preferably further characterized in that the birefringent layer is a uniaxially oriented polymer layer.

In order to obtain a bright projected image, the radiation source in the projection apparatus should emit a projection beam of high intensity. Such a beam heats up the element that it traverses. A very birefringent element having a high temperature resistance is obtained when the polymer layer is formed from a cured liquid crystalline monomer composition. The polymer layer is preferably formed from a polymer network having nematic groups in the molecular chains.

In order to orient the polymer layer(s) by rubbing the surface of the transparent substrate supporting such a layer, it is efficacious that a layer of polyamide is present between each polymer layer and a supporting substrate.

BRIEF DESCRIPTION OF DRAWINGS

The invention will now be elucidated, by way of example, with reference to the drawings, in which.

DETAILED DESCRIPTION OF THE PREFERRED EMBODIMENTS

Figure 1:
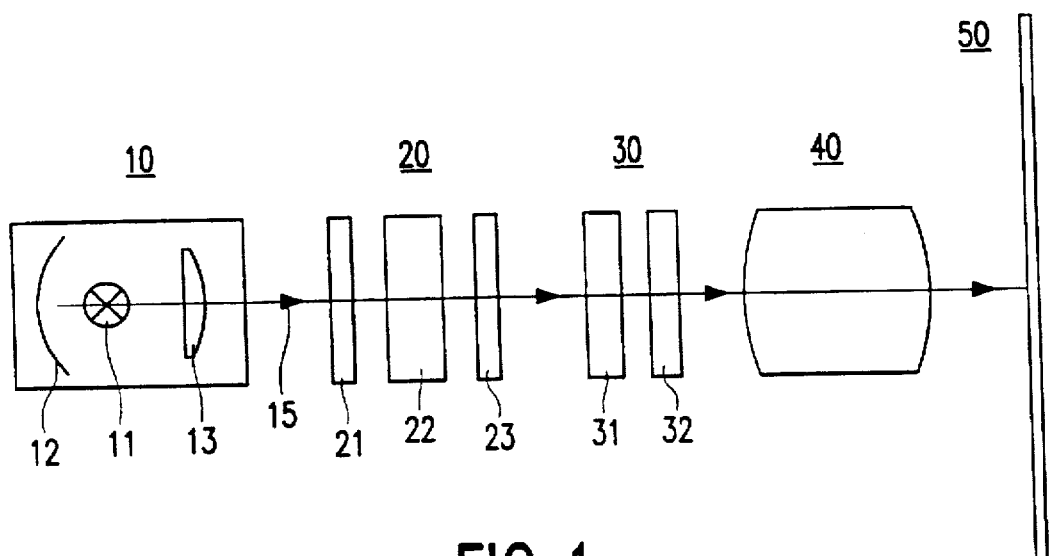
FIG. 1 is a schematic diagram of a projection apparatus using optical interlace.

As shown in FIG. 1 the interlaced image projection apparatus comprises an illumination unit 10, supplying a projection beam which is represented by its axis 15, an image display unit 20, a beam-shifting unit 30, a projection lens 40 and a projection screen 50. The illumination unit 10 comprises a lamp 11, for example an ultrahigh pressure mercury lamp, a reflector 12 and a condensor lens 13. The unit 10 preferably also comprises integrator plates to obtain a projection beam having a uniform intensity and a cross-section adapted to the display panel to be illuminated. Examples of such illumination units are disclosed in U.S. Pat. Nos. 5,098,184 and 5,184,248.

The image display unit is represented by a single display panel 22, for example, a twisted nematic liquid crystalline panel of the active matrix type, which is preceded by a polarizer 21 and succeeded by an analyzer 23. In a colour projection apparatus, the unit 20 may comprise a colour-separating system, three display panels for the primary colours red, green and blue and a colour recombination system, as is well known in the art. The projection lens comprises a number of lens elements and is preferably a zoom lens. The units 10, 20 and 30 are accommodated in one housing. The projection screen 50 may be a rear-view projection screen accommodated in the housing, at the front side of the apparatus. The apparatus may also be a front-view projector, the projection screen then being a free standing screen or a screen fixed to a wall.

In a conventional projection apparatus, the number of pixel rows in the display panel should be equal to the number of image lines in the video signal received by the apparatus. As already remarked, such a display panel suffers from the disadvantages of difficult manufacture, a small aperture ratio and an image with poor contrast and flicker. Moreover, it is very difficult to increase the number of pixels of such a panel in such a way that it will be suitable for displaying a high-definition video signal.

Figure 2:
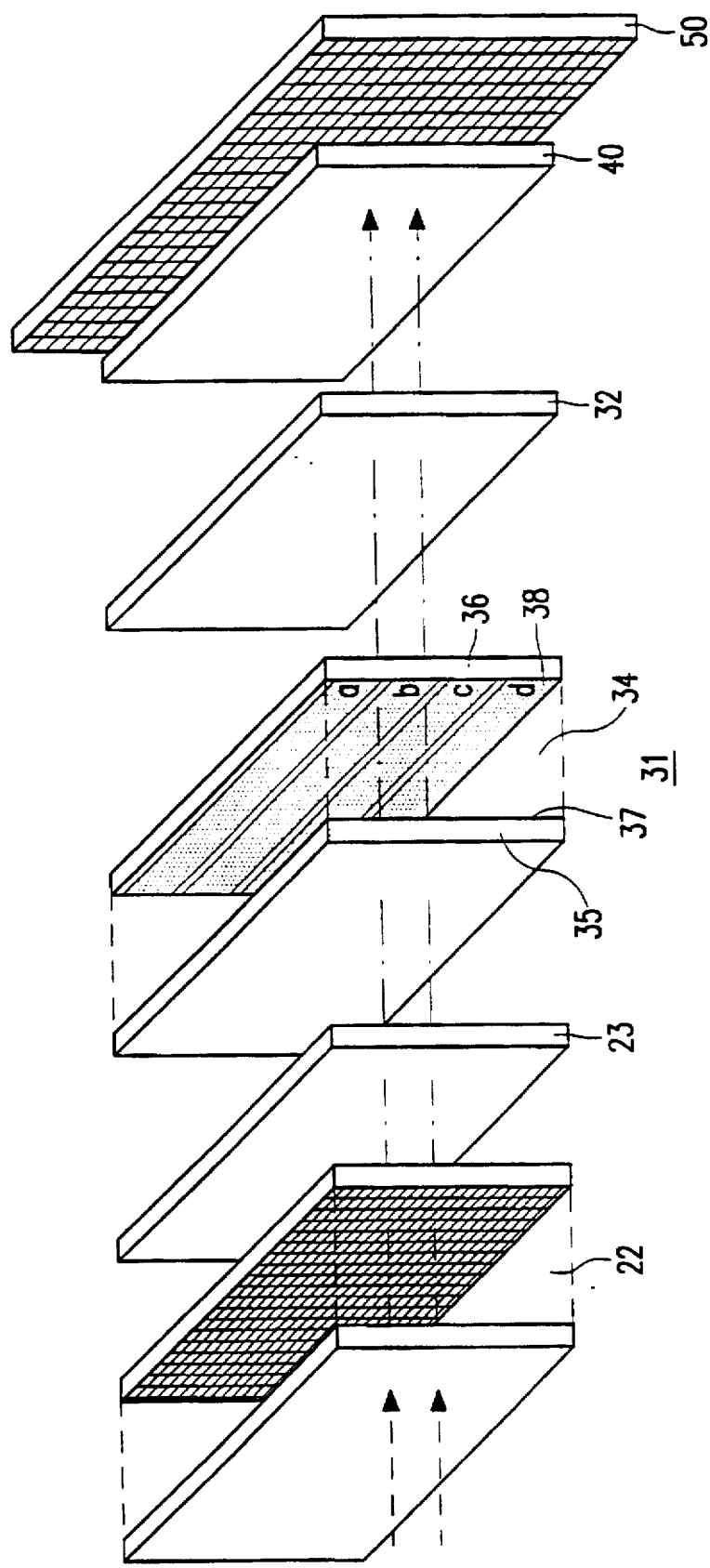
FIG. 2 is a perspective view of part of this apparatus.

In order to overcome said problems of a conventional projection apparatus, an electro-optical deflection unit 30 comprising a polarization switch 31 and a birefringent element 32 is introduced in the apparatus. Part of the apparatus with such an electro-optical unit is more clearly illustrated in a perspective view in FIG. 2. The direction of the projection light extends from left to right. FIG. 2 does not show the illumination unit 10 and the polarizer 21 of FIG. 1, but starts with the display panel 22 and the associated analyzer 23. The electro-optical deflection unit 30 is arranged between this analyzer and the projection screen 50, preferably in front of the projection lens 40, which is shown very schematically. The electro-optical deflection unit comprises a polarization switching element 31 which, dependent on the applied electric signal, either does or does not rotate the plane of polarization of the light passing through it by ninety degrees, and a birefringent element 32 which, dependent on the polarization of the light passing through it, either produces or does not produce a vertical positional shift. The polarization switching element is constituted by a panel comprising a layer 34 of electro-optical material and electrodes 37, 38 on substrates 35, 36 between which the layer 34 is sandwiched. The material of the layer 34 is, for example, a liquid crystalline material or a ferro-electric material. One of the electrodes is divided into a number of strip-shaped electrodes. If the light from each pixel row of the display panel were individually deflected, a complex electrode structure on the display panel and a large number of drive circuits would be needed. The electrode 38 therefore is preferably divided into a small number of strip-shaped electrodes 38a–38d, so that the panel comprises a small number of horizontal segments, each of which deflects a number of pixel rows. In the embodiment of FIG. 2 the switching panel comprises four horizontal segments, but there may also be a number of, for example, ten segments. This number is not a critical parameter of the apparatus.

Figure 3:
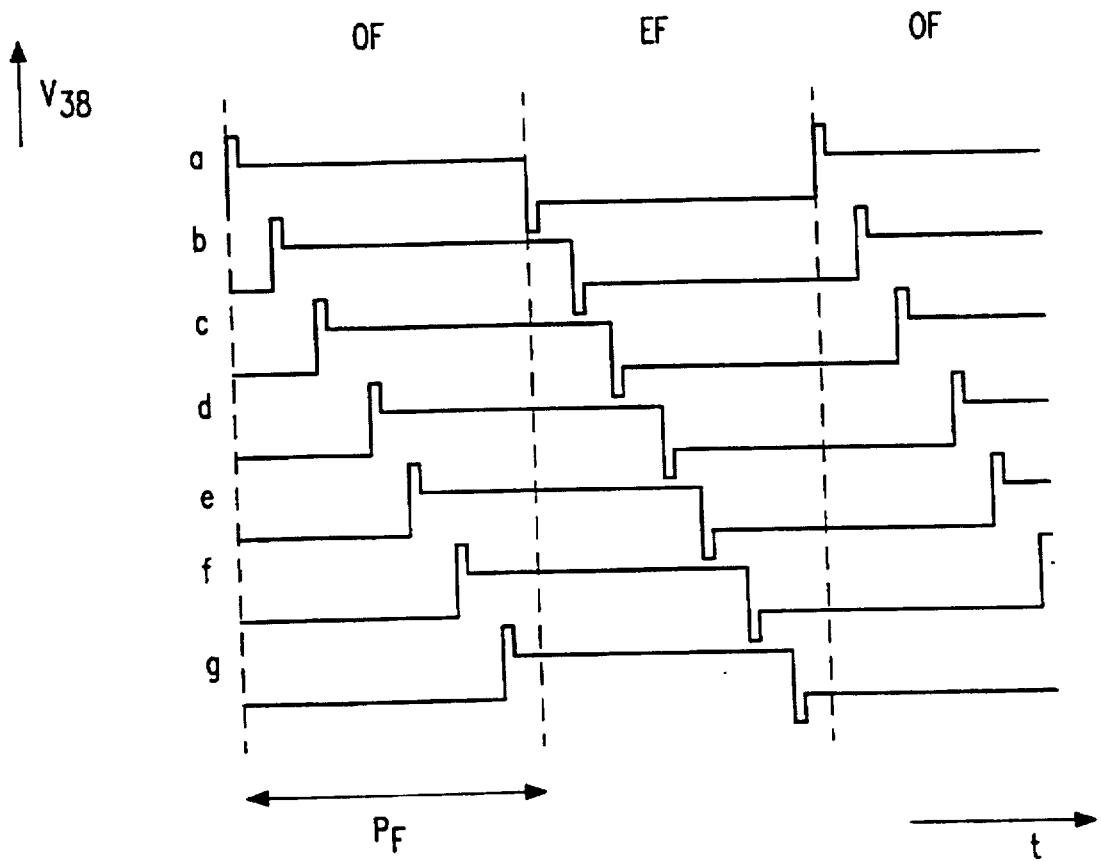
FIG. 3 is a schematic view of the drive voltages for the polarization switch used in the apparatus.
Figure 4:
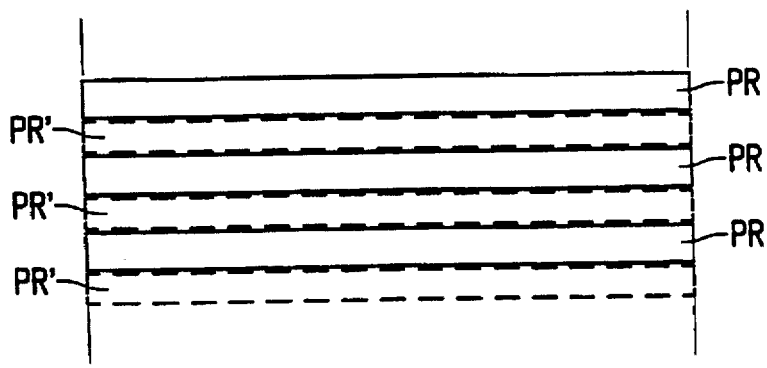
FIG. 4 illustrates the apparent shifting of pixel rows due to the polarization switching.

The polarization switch can be driven, for example, in the way as shown in the above cited article in Asia Display, 1959, pages 79–81. FIG. 3 shows the drive voltage wave form and time scale for the polarization switch for the case where the latter comprises four segments a, b, c, d, e, f, g. $p_F$ is the field period, i.e. half the period of a video frame, and OF and EF are the odd field and even field, respectively. The drive voltage $V_{3g}$ for the succeeding segments a-g consists of a short pulse and a DC voltage. The pulses for the different segments are shifted to each other such that together they fill the field period. The pulses are bipolar to eliminate DC voltages. The drive voltages are synchronized with the video signal to be displayed. By applying these voltages to the strip-shaped electrodes 38a–38g, each of these electrodes, within each frame period, is active during a first time interval and inactive during a second time interval. The first and second time intervals have the length of the field period. The result is that the light from the pixel rows belonging to a given switch segment, a, b, c, d, e, f or g is switched by such a segment between two positions, with one of these positions being coupled to the even field lines of the displayed image and the other position being coupled to the odd field lines. This is schematically illustrated in FIG. 4 for a few pixel rows belonging to one switch segment.

This Figure shows, in solid lines, the apparent positions of the pixel rows PR during a first half frame period and, in broken lines, the apparent positions of the pixel rows PR' during a second half frame period. For illustrative purposes, the distance between the rows is supposed to be the same as the height of the rows. In practice, however the pixel rows preferably have a height which is larger than the distance between these rows.

Figure 5:
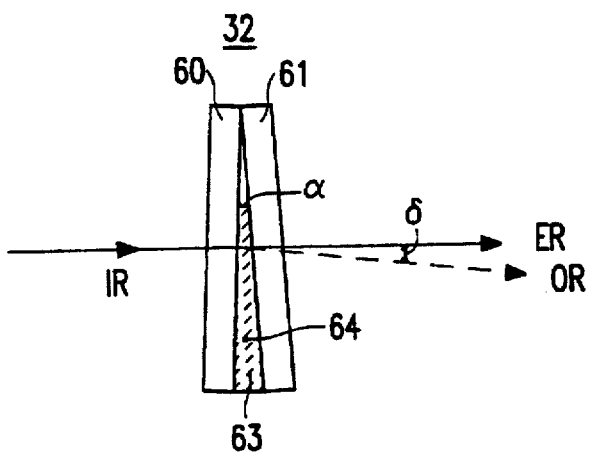
FIG. 5 is a first embodiment of the deflection element according to the invention.

FIG. 5 shows a first embodiment of the birefringent element 32 according to the invention. It consists of two thin plates 60, 61 of glass or another transparent material, for example, transparent plastics. These plates enclose a small angle α between them. The wedge-shaped space 63 is filled with a polymer material 64, which is aligned, or oriented, in such a way that the optical axis of the material is the same everywhere. In its simplest concept, the optical axis lies in the surface of the glass plates and is parallel to the top of the wedge. The angle at which a wedge of optical material deflects an incident ray 70 is given approximately by the formula (n−1) α wherein n is the refractive index of the material and α is the apex angle. For one polarization direction of the incident ray the refractive index is the index for the ordinary ray ($n_O$) while for the other polarization direction it is the index of the extraordinary ray ($n_e$). The difference δ between the deflection angles of the extraordinary ray ER and the ordinary ray OR is thus given by: ($n_O$−$n_e$) α.

Figure 6:
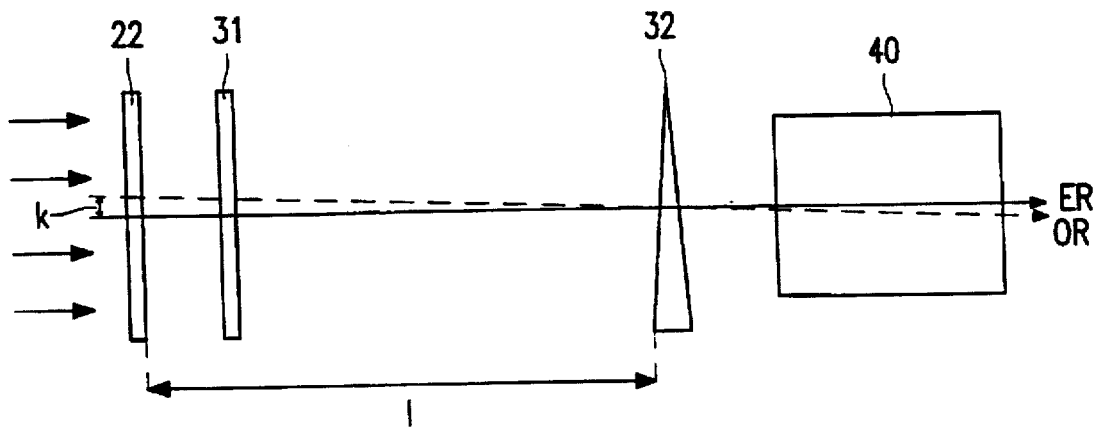
FIG. 6 illustrates the shifting of light rays by this element.

By arranging the deflection element 32 in the path of the projection light it is achieved that for one of the polarization directions, determined by the polarization switch 31, the pixel rows images formed by the projection lens 40 are shifted relative to the images of the same pixel rows when projected with light of the other polarization direction. Viewed in the backward direction, from projection lens to the display panel, the deflection element causes an apparent lateral displacement k of the pixel rows, as illustrated in FIG. 6. This lateral displacement is the product of the deflection angle α and the distance 1 from the deflection element 32 to the display panel 22. Care should be taken that this displacement is approximately equal to half the distance between the pixel rows.

As is shown in FIG. 6, the deflection element may also be a self-supporting body of birefringent oriented polymer material which is not sandwiched between two substrates.

It is desirable to minimize the thickness of the birefringent polymer layer 64, so that no light scattering occurs. The polymer thickness at the base of the wedge decreases if the wedge angle α is reduced, but this would also reduce the deflection angle δ. To maintain the required lateral displacement, the distance 1 would have to be increased. Thus, the minimum polymer thickness is obtained when the deflection element 32 is placed as far as possible from the display panel 22, but in such a position that there are no intervening optical components that will upset the polarization direction of the light. In practice this means that the ideal position of the deflection element is close to the projection lens at the side nearest to the display panel. A typical distance between the display panel and the projection lens in an embodiment of an image projection apparatus is about 160 mm, and a polymer has ordinary and extraordinary refractive indices of 1.52 and 1.68 respectively. To achieve, at the display panel, a displacement of 20 μm, i.e. half the row period of a conventional panel, these values would require a wedge angle α of 0.045 degrees. The wedge must have a height which is slightly larger than the projection lens aperture (typically 25 mm.) so that the polymer layer would have a maximum thickness of about 20 μm. Such a thickness does not cause any problems with respect to light scattering by, or molecular alignment in, the polymer wedge.

The displacement is directly proportional to the spacing between the deflection element and the display panel. Thus, if a tolerance of, for example, 1 μm is considered desirable, which implies an accuracy of one part in twenty, then the spacing tolerance is 8 mm (i.e. 160/20). Positioning the deflection element to this accuracy does not cause any problems. The wedge angle α should be controlled to a similar accuracy of one part in twenty, i.e. the base spacing between the plates 60 and 61 should be 20 μm+1 μm.

The difference in deflection and displacement has been considered hereinbefore. The ordinary and extraordinary rays would have actual displacement of 85 μm and 65 μm, respectively. Compared to the display panel size, these displacements are small but, if necessary, the centre line of the projection lens could be displaced relative to the centre line of the display panel by the mean value of the two displacements, i.e. 75 μm. It is also possible to incorporate a compensating wedge into one of the plates 60, 61.

If larger displacements are required, the distance between the display panel and the birefringent wedge 32 could be increased, if this is not possible two or more wedges could be arranged in series. Chevron profiles on one of the glass substrates, as shown in FIG. 7, are also possible.

Figure 7:
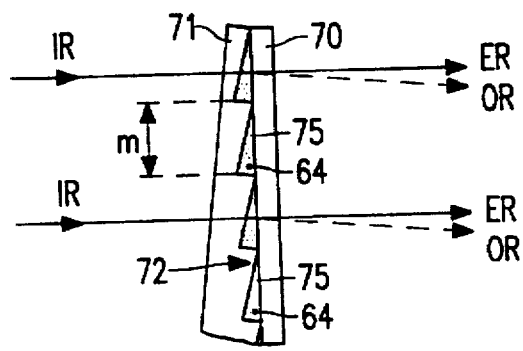
FIGS. 7, 8 and 9 show a second, a third and a fourth embodiment of the deflection element.

The deflection element of FIG. 7 consists of two plates 70, 71 of glass, or another transparent material. One of the plates, for example plate 71, is provided with a sawtooth-shaped surface profile 72 and the space between this surface and the other plate is filled with the polymer material. The single wedge of FIG. 5 is now subdivided into a number of small wedges 75 which perform the same function as the single wedge. There is a large number of wedges so that their height m is small. The wedge angle may therefore be chosen to be larger than in the case of FIG. 5 without the polymer material becoming too thick.

Figure 8:
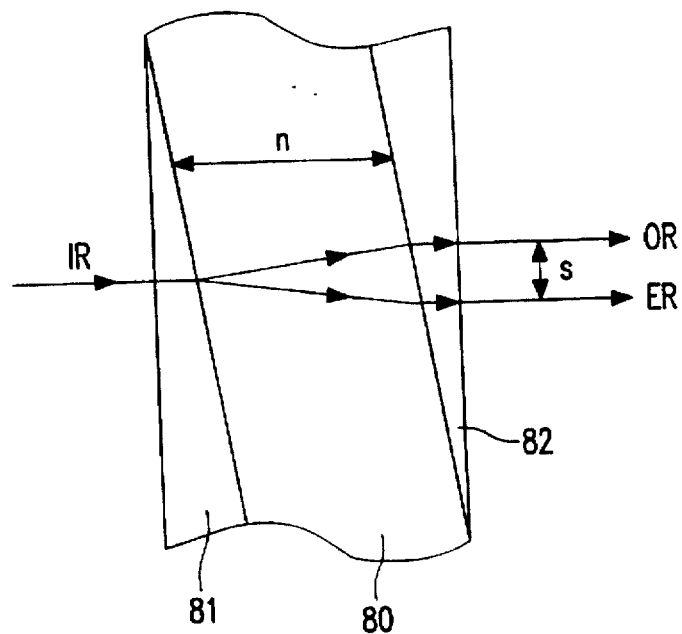

FIG. 8 shows a first embodiment of a deflection element providing a lateral shift which is constant and independent of the axial position of the element. The element consists of a central substrate 80 of transparent isotropic material. Both sides of this substrate are covered with an oriented polymer layer 81, 82. These layers are wedge-shaped so that the element has the form of a plane-parallel plate and the exit rays ER and OR have the same direction as the incident ray IR. The incident ray is split at the interface of layer 81 and substrate 80 into an extraordinary ray ER and an ordinary ray OR, which rays are angularly shifted. At the interface of substrate 80 and layer 82, the rays are deflected opposite the deflection at the interface of layer 81 and substrate 80 so that the rays become parallel. The lateral shift s of the rays ER and OR is determined by the thickness n of the substrate.

Figure 9:
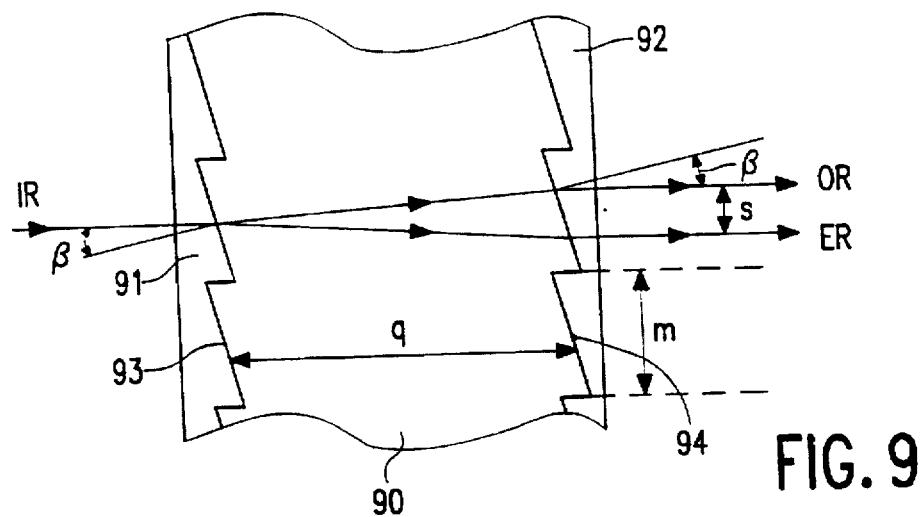

FIG. 9 shows a second, preferred embodiment of a deflection element providing a lateral shift. Moreover this embodiment moreover has the same advantage as that of FIG. 7. The element comprises a central substrate 90 of transparent isotropic material, glass or plastics, with a thickness q and a refractive index $n_i$. Both sides of this substrate are provided with a thin layer of anisotropic oriented polymer 91,92. These layers have an ordinary refractive index $n_o$ and an extraordinary refractive index $n_e$. The interface of layer 91 and substrate 90 and the interface of substrate 90 and layer 91 have a sawtooth-shaped structure 93,94, respectively. The lateral displacement of the extraordinary ray ER relative to the ordinary ray OR is determined by the angle β between the incident ray IR and the normal to the skew facets of the structure 93,94, the three refractive indices $n_i$, $n_o$ and $n_e$ and the thickness q of the substrate 90.

Figure 10:
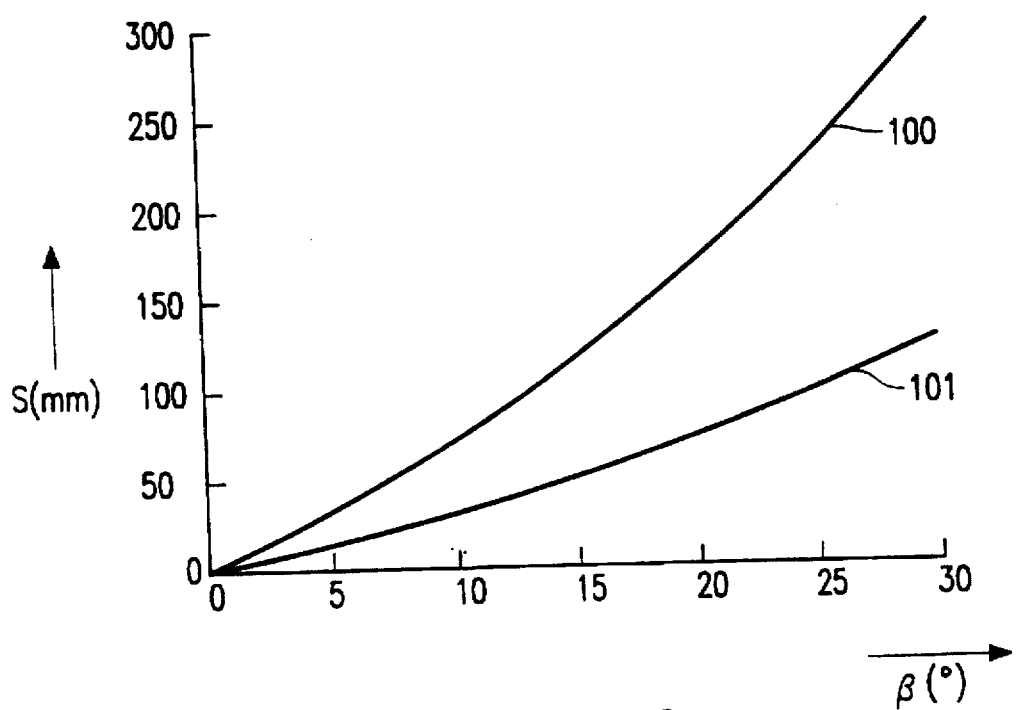
FIG. 10 and 11 are graphs of the pixel-row displacement as a function of the incident angle for respective different thicknesses of the deflection element and different extraordinary indices of this element.

FIG. 10 shows the variation of the lateral displacement s (in micrometres) as a function of the angle β of a deflection element according to FIG. 9, for which $n_i$=1.58, $n_o$=1.52 and $n_e$=1.68. The graph 100 holds for a thickness q=5 mm, and the graph 101 for a thickness q=2 mm.

Figure 11:
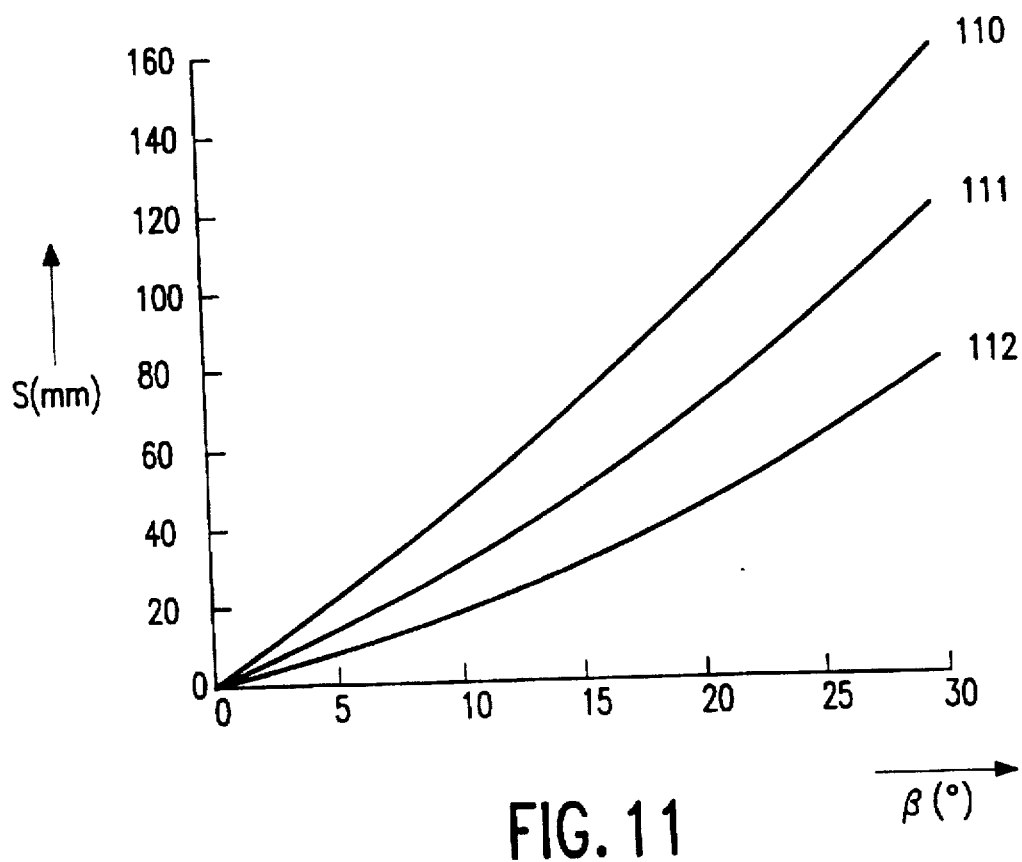

FIG. 11 shows the variation of the lateral displacement s as a function of the angle β of such an element with q=2 mm., $n_i$ =1.58, $n_o$=1.52 and with $n_e$=1.74 (graph 110), $n_e$=1.68 (graph 111) and $n_e$=1.62 (graph 112), respectively.

The lateral displacement is independent of the thickness of the anisotropic layers 91 and 92, so that this thickness can be chosen to be minimum. Because of the symmetrical design of the deflection element, it is ensured that the ordinary ray and the extraordinary ray are parallel to each other.

The pitch of the sawtooth structure of the deflection element of FIG. 9 may be equal to that of the display panel or to a multitude thereof. In the latter case, the chances that alignment errors occur are reduced.

The manufacturing of the deflection element of FIG. 9 could start from an isotropic plate both sides of which are provided with a sawtooth structure, for example, by surface deformation by means of hot pressing between two dies having surface structures which are negatives of the sawtooth structures. The anisotropic layers are provided on both sides of such a deformed plate. It is also possible to provide an isotropic substrate with an anisotropic layer having the required sawtooth profile by means of a replica photopolymerization process. On this layer, a thick isotropic layer having at its side opposite the first sawtooth profile a second sawtooth profile, is polymerized, for example also by a replica photopolymerization process. A third, anisotropic layer having a flat outer surface is provided on the second profile.

Figure 12:
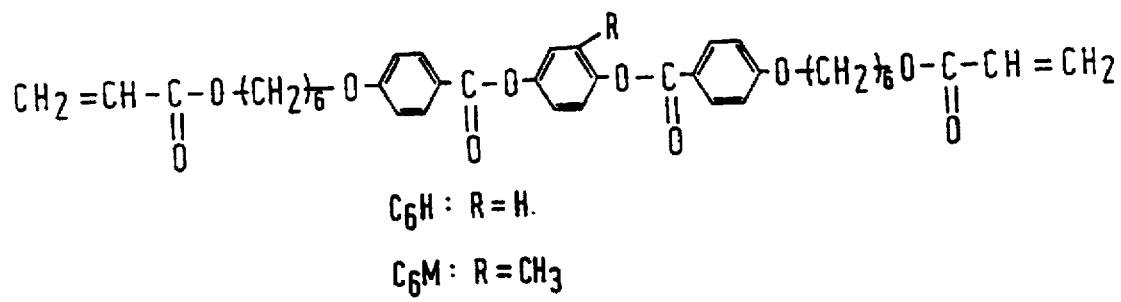
FIG. 12 is a structural formula of a liquid-crystalline material suitable for the invention.

Suitable compositions for the anisotropic material in the embodiments of FIGS. 5, 7, 8 and 9 are liquid crystalline acrylates, epoxides and vinyl ethers. Particularly suitable are network-forming monomer compositions, such as a mixture of 20% by weight of acrylate monomer C6H and 80% by weight of acrylate monomer C6M having the structure formula shown in FIG. 12.

In an embodiment of the deflection unit shown in FIG. 9, the isotropic material is polycarbonate and the anisotropic material is the above-mentioned mixture of acrylate monomers to which is 0.5% by weight of Irgacure 651 is added as photo-initiator and 200 ppm of p-methoxy phenol as inhibitor. On both sides of a polycarbonate plate, having a thickness of 4 mm, sawtooth structures are pressed at a temperature of 200° C. by means of two mutually aligned dies provided with the required sawtooth surface structures having a pitch of 0.14 mm. Then one side of the plate is rubbed with a cloth in the direction parallel to the grooves. A flat die comprising a flat glass plate provided with a thin coating of octadecyl-trimethoxy-silane is also rubbed with a cloth in a direction opposite to the rubbing direction of the polycarbonate plate. Subsequently the anisotropic LC material is applied between the plate and the die and these elements are pressed together at a temperature of 80° C. until a homogeneous layer, which is free from air bubbles, is obtained. By illumination with UV light, the oriented LC layer is cured at a temperature of 80° C., after which the die is removed. In an analog way a second LC layer is polymerized at the second side of the polycarbonate plate If the angle between the skew facets of the sawtooth and the plate surface is 10° the deflection element thus obtained provides a lateral displacement of 0.07 mm of the extraordinary ray relative to the ordinary ray, which means that a pixel of the display panel is displaced along this distance.

Figure 13:
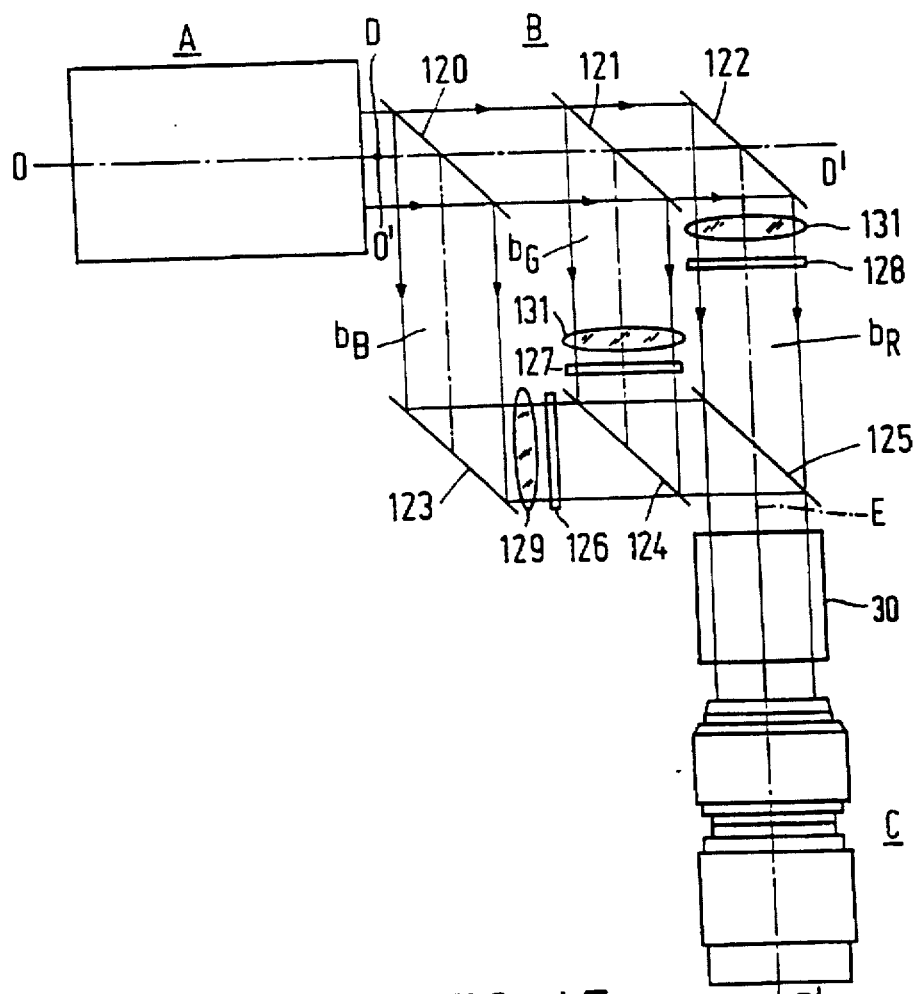
FIG. 13 is a schematic diagram of a color projection apparatus including a deflection element according to the invention.

FIG. 13 shows diagrammatically an embodiment of a colour image projection apparatus. This apparatus comprises three main sections: an illumination unit A, a display unit B and a projection lens unit C. The illumination unit may be constructed as disclosed in U.S. Pat. No. 5,098,184 or U.S. Pat. No. 5,184,248. The principal axis OO' of the illumination unit is in alignment with the optical axis DD' of the apparatus, which is first divided into three sub-axes and combined at a later stage combined to one optical axis coinciding with the optical axis EE' of the projection lens unit.

The beam from the illumination unit A is incident on a colour-selective reflector 120, for example, a dichroic mirror which reflects, for example, the blue colour component $b_B$ and passes the rest of the beam. This beam portion reaches a second colour-selective reflector 121 which reflects the green colour component $b_G$ and passes the remaining red colour component $b_R$ to a reflector 122 which reflects the red beam component to the projection lens unit. The reflector 122 may be a neutral reflector or a reflector which is optimized for red light. The blue beam component is reflected by a neutral or a blue-selective reflector 123 to a display panel 126 in the form of a liquid crystalline panel. This panel is electronically driven in known manner, so that the blue component of the image to be projected appears on this panel. The beam component modulated with the blue information reaches the projection lens unit C via a colour-selective reflector 124 which passes the blue beam component and reflects the green beam component, and a further colour-selective reflector 125 which reflects the blue beam component. The green beam component $b_G$ traverses a second display panel 127 where it is modulated with the green colour component and is then reflected to the projection lens unit C successively by the colour-selective reflectors 124 and 125. The red beam component $b_R$ traverses a third display panel 128 where it is modulated with the red colour component and subsequently reaches the projection lens unit via the colour-selective reflector 125.

The blue, red and green beam components are superimposed at the input aperture of the lens unit, so that a colour image is created at this aperture, which is imaged in a magnified form by this unit on a projection screen, not shown in FIG. 13.

The optical path lengths between the output of the illumination unit A and each display panel 126, 127 and 128 are preferably equal so that the red, blue and green beam components have equal cross-sections at the location of their display panel. Also the optical path lengths between the display panels 126, 127 and 128 and the input aperture of the projection lens unit are preferably equal so that the differently coloured scenes are satisfactorily superimposed on the projection screen.

The lenses 129, 130 and 131 arranged in front of the display panels are field lenses which ensure that all light coming from the exit plane of the illumination unit is concentrated in the entrance pupil of the projection lens unit.

The deflection unit 30 of the present invention, shown as one block in FIG. 13, is preferably arranged in the combined light path in front of the projection lens unit C. Then only one such unit is needed, which can be positioned at a suitable distance from the display panels.

The invention may also be used in a projection apparatus with reflective display panels, instead of transmissive panels, and with a dichroic cross to split the beam from the illumination unit into red, green and blue beam components and to combine these beam components after they have been reflected by their respective display panel. Such a projection apparatus is disclosed in FIG. 28 of U.S. Pat. No. 5,184,248. The invention may also be used in a colour projection apparatus wherein each colour channel comprises its own illumination unit, display panel and necessary optics, this apparatus comprising a beam combiner arranged in front of the projection lens unit. Such an apparatus is shown in FIG. 29 of U.S. Pat. No. 5,184,248. The deflection unit according to the invention is again preferably arranged between the beam combiner and the projection lens unit.

The invention may generally be used in any image projection apparatus utilizing one or more matrix-type display panels, such as a twisted nematic liquid crystalline panel or a polymer dispersed liquid crystalline panel.

What is claimed is:

1. An image projection apparatus comprising an illumination unit, an image display unit having at least one display panel, a projection lens for projecting the image generated by the display unit onto a projection screen and an electro-optical deflection unit arranged between the display unit and the projection lens, being switchable between a first mode and a second mode and comprising a polarization switch and a birefringent element, whereby the light rays from the display unit passing through the deflection unit if the deflection unit is in the first mode are shifted relative to said light rays passing through the deflection unit if this unit is in the second mode, characterized, in that the birefringent element comprises at least one birefringent oriented polymer layer.

2. An image projection apparatus as claimed in claim 1, characterized in that, the birefringent element comprises at least one wedge-shaped birefringent body.

3. An image projection apparatus as claimed in claim 1, characterized in that the birefringent element comprises at least one wedge-shaped birefringent oriented polymer layer sandwiched between two transparent plates of isotropic material and extending at an acute angle with each other.

4. An image projection apparatus as claimed in claim 1, characterized in that the birefringent oriented polymer layer comprises a series of triangular elements jointly constituting a sawtooth-shaped layer which is fixed to a transparent isotropic substrate.

5. An image projection apparatus as claimed in claim 1, characterized in that, the birefringent element comprises a central substrate of isotropic material and a first and a second layer of birefringent oriented polymer at the first and the second main surface, respectively, of the substrate, and in that the interfaces between the layers and the substrate are parallel to each other and extend at an acute angle with the entrance and exit faces of the element.

6. An image projection apparatus as claimed in claim 1, characterized in that the birefringent element comprises a central substrate of isotropic material and a first and a second layer of birefringent oriented polymer at the first and the second main surface, respectively, of the substrate, and in that the interfaces between the layers and the substrate are sawtooth-shaped.

7. An image projection apparatus as claimed in claim 6, characterized in that the birefringent layer is a uniaxially oriented polymer layer.

8. An image projection apparatus as claimed in claim 7, characterized in that the polymer layer is formed from a cured liquid crystalline monomer composition.

9. An image projection apparatus as claimed in claim 8, characterized in that the polymer layer is formed from a polymer network having nematic groups in the molecular chains.

10. An image projection apparatus as claimed in claim 9, characterized in that a polyamide layer is present between each polymer layer and a supporting substrate.

11. A birefringent element, characterized by the features of claim 1 relating to the birefringent element.

12. An image projection apparatus as claimed in claim 1, characterized in that the birefringent layer is a uniaxially oriented polymer layer.

13. An image projection apparatus as claimed in claim 2, characterized in that the birefringent layer is a uniaxially oriented polymer layer.

14. An image projection apparatus as claimed in claim 3, characterized in that the birefringent layer is a uniaxially oriented polymer layer.

15. An image projection apparatus as claimed in claim 4, characterized in that the birefringent layer is a uniaxially oriented polymer layer.

16. An image projection apparatus as claimed in claim 5, characterized in that the birefringent layer is a uniaxially oriented polymer layer.

17. An image projection apparatus as claimed in claim 6, characterized in that a polyamide layer is present between each polymer layer and a supporting substrate.

18. An image projection apparatus as claimed in claim 7, characterized in that a polyamide layer is present between each polymer layer and a supporting substrate.

19. An image projection apparatus as claimed in claim 8, characterized in that a polyamide layer is present between each polymer layer and a supporting substrate.

20. An image projection apparatus as claimed in claim 12, characterized in that a polyamide layer is present between each polymer layer and a supporting substrate.

* * * * *